Feb. 6, 1934.　　　　A. A. ROBEY　　　　1,946,362

STERILIZING APPARATUS

Filed Oct. 24, 1932　　　2 Sheets—Sheet 1

Witness
H. E. Van Dine

Inventor
Andrew Alexander Robey
by his attorneys
Van Emen, Fish, Hildreth & Cary Feb. 6, 1934.        A. A. ROBEY        1,946,362
STERILIZING APPARATUS
Filed Oct. 24, 1932        2 Sheets-Sheet 2
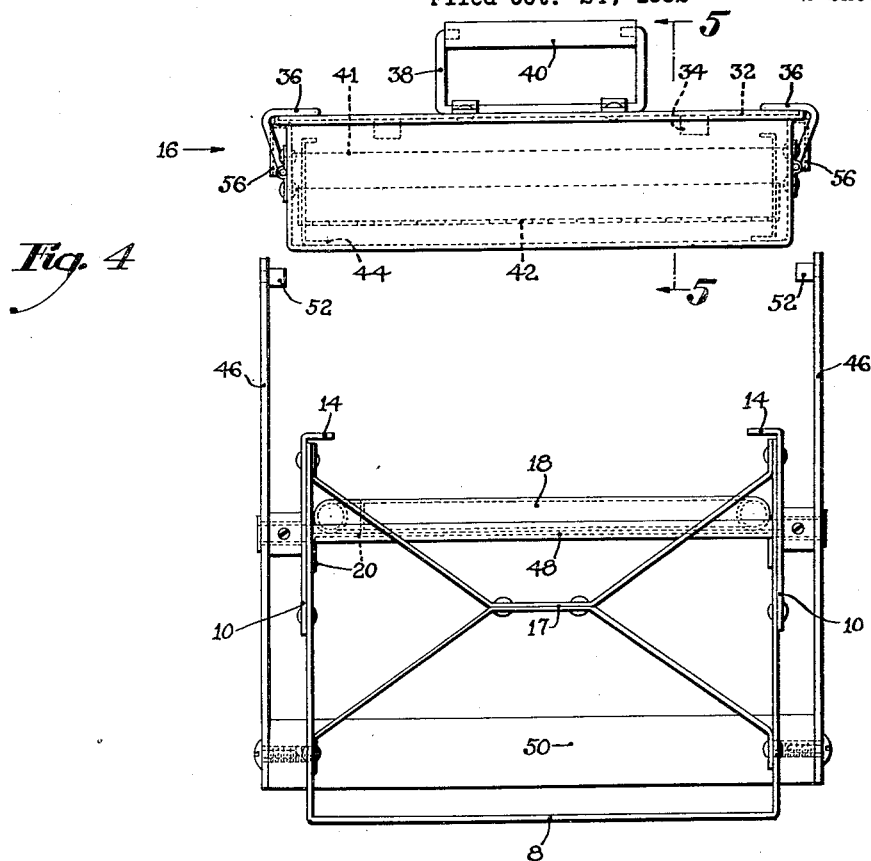
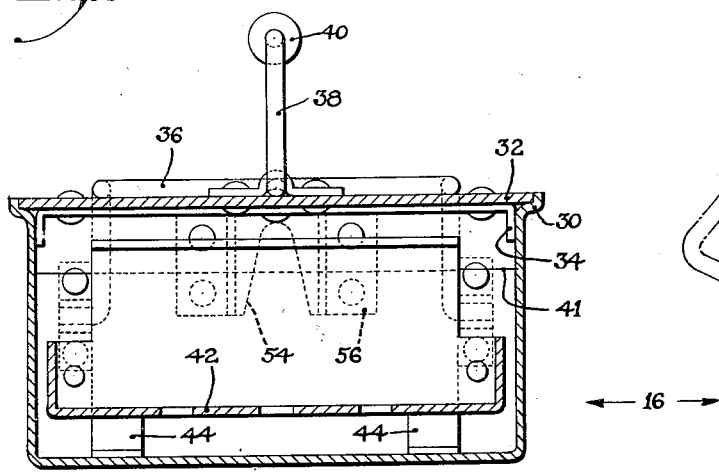
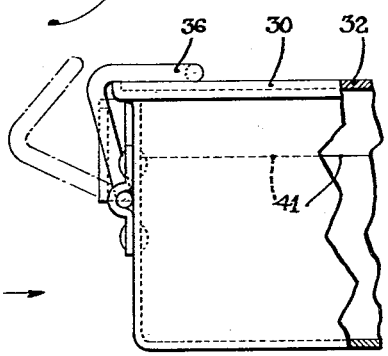

Patented Feb. 6, 1934

1,946,362

UNITED STATES PATENT OFFICE 1,946,362

STERILIZING APPARATUS

Andrew Alexander Robey, Lowell, Mass.

Application October 24, 1932. Serial No. 639,198

11 Claims. (Cl. 167—3)

The present invention relates to sterilizing apparatus, and is particularly adapted for sterilizing surgical instruments and other paraphernalia.

The principal object of the invention is to provide a simple and practical sterilizing apparatus which will act automatically to remove the sterilizing container from the heating unit before the entire evaporation of the sterilizing liquid in the container has taken place with consequent overheating and injury to the apparatus and the instruments or other paraphernalia contained therein.

It is a further object of the invention to provide a simple and inexpensive, yet sturdy, device of this description which is operated automatically by mechanical means set in operation by the loss of weight through the evaporation of the sterilizing liquid, and will operate in a satisfactory manner regardless of variations in weight of articles placed in the container.

With these and other objects in view, as may hereinafter appear, a principal feature of the invention consists in the cooperative arrangement of means rendered operative by loss of weight to move the sterilizing container out of the influence of a heating unit, with a sterilizing container or vessel constructed and arranged to prevent the displacement of a substantial proportion of the sterilizing liquid in the container, and thus to insure a sufficient loss of weight, through evaporation of the sterilizing liquid, to insure the proper operation of the device regardless of wide variations in the weight and bulk of articles placed in the container.

Another feature of the invention consists in the provision of a weighted support for the container arranged to turn about a horizontal axis wherein the weight is so located with relation to the axis and the point of support for the container as to provide a relatively great lifting moment for said container on one side of a vertical plane extending through the axis, and a relatively small lifting moment for the container on the other side of the axis.

Figure 1:
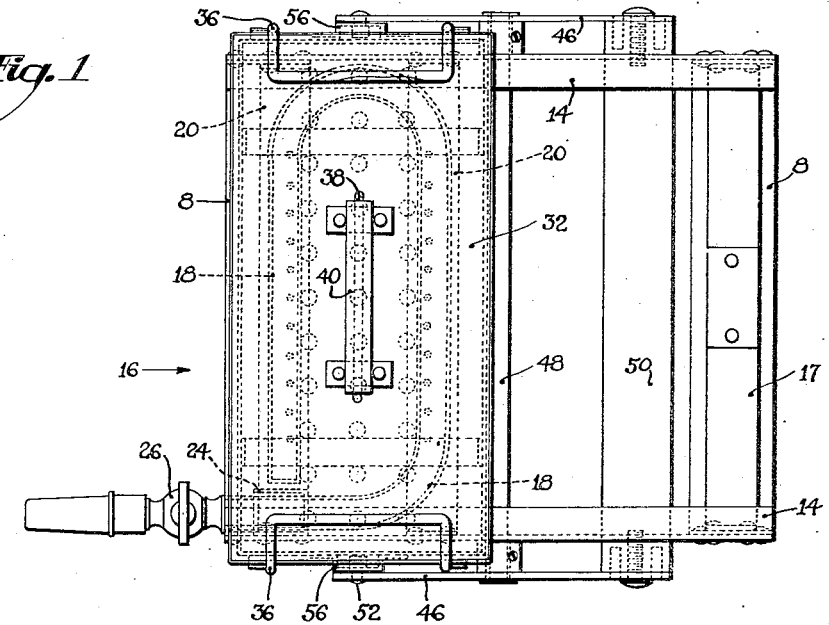
Figure 2:
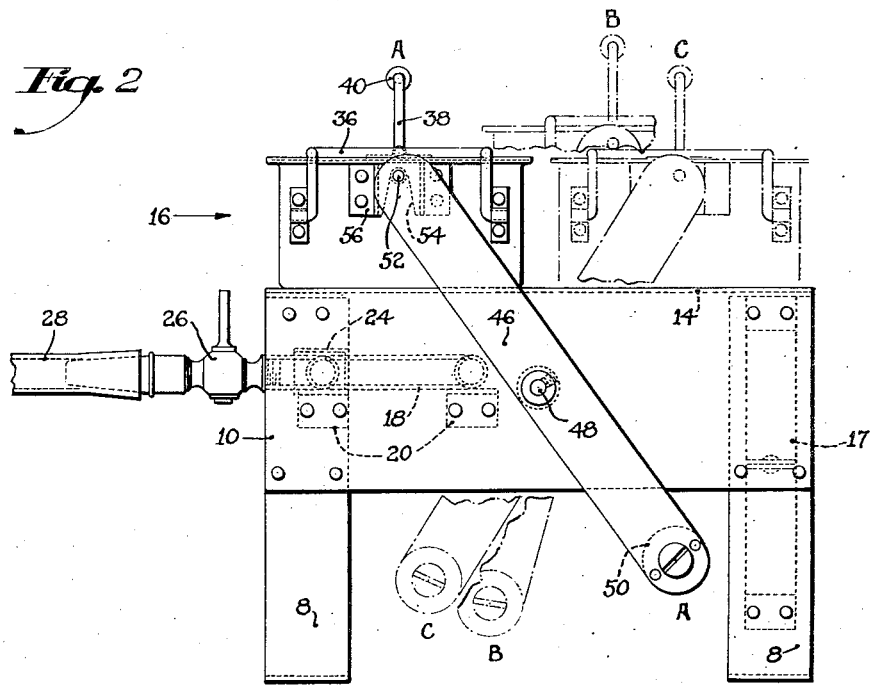
Figure 3:
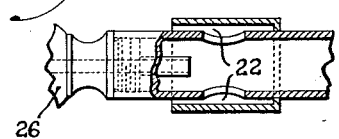

The several features of the invention consist also in the devices, combinations and arrangement of parts hereinafter described and claimed, which together with the advantages obtained thereby will be readily understood by one skilled in the art from the following description taken in connection with the accompanying drawings in which: Fig. 1 is a plan view of a sterilizing apparatus embodying the features of the invention; Fig. 2 is a view in front elevation of the apparatus as shown in Fig. 1, with two additional positions of the container and its support indicated in dot dash lines; Fig. 3 is a detail view partly in section of the air inlet for the gas burner shown in the drawings; Fig. 4 is a view in right side elevation of the apparatus with the container lifted off its support to show the relationship of the parts; Fig. 5 is a sectional detail view taken on the line 5—5 of Fig. 4 to show the construction of the sterilizing container; and Fig. 6 is an enlarged detail view of one end of the container showing the metal clasp for locking the cover in position on the container.

The sterilizing apparatus disclosed in the drawings embodying in a preferred form the several features of the present invention is provided with a stationary frame which comprises two U-shaped members 8 connected across their upper ends by means of two plates 10 and having their upper edges bent inwardly to provide horizontal supporting flanges 14 for the sterilizing vessel or container designated at 16. A brace 17 connecting the two legs of one of the U-shaped members 8 adds to the rigidity of the frame. A heating unit is mounted beneath the supporting flanges 14 on the left side of the frame, as shown in Fig. 2, immediately beneath the sterilizing vessel or container when supported on the flanges 14 in the position shown in full lines in this figure. In the preferred form of the invention, a gas burner is employed for heating the sterilizing vessel or container, and comprises a Bunsen burner 18 which is supported and rigidly secured in position on two laterally extending supports 20 connecting the opposite sides of the frame. This burner takes the form of a U-shaped pipe provided on both sides with outlets which are placed to direct the flame inwardly towards the central bottom portion of the container. An air inlet is provided at 22 protected by means of a cylindrical casing 24, as best shown in Fig. 3 to prevent possible ignition of the gas at this point. The burner is connected through a valve 26 and a flexible pipe 28 to any convenient source of supply.

The sterilizing vessel or container 16 comprises an oblong box provided at its outer edge with an upwardly and outwardly extending lip 30 to receive a cover 32. Two laterally extending braces 34 secured to the inner side of the cover and provided at each end with downwardly extending flanges arranged to engage with the inner walls of the container 16 serve to hold the cover securely in position. Spring clips 36 hinged on each end of the container 16 are arranged when moved into the position shown in full lines in Fig. 6, to lock the cover in place. There is also secured to the top of the cover a handle 38 provided with an insulated portion 40 for convenience in carrying the container while still in a heated condition. A line 41 marked around the walls of the container serves to indicate the level to which the vessel should be filled with sterilizing liquid.

Within the container there is mounted a perforated tray 42 which is arranged to fit loosely within the container, and is provided at each end with vertical standards 44 to raise the tray an appreciable distance from the bottom of the container. It will be seen from an inspection of Figs. 4 and 5, that this tray considerably reduces the capacity of the container for carrying articles to be sterilized, and thus proportionally limits the possible displacement of the sterilizing fluid within the container by articles placed therein so that a sufficient loss of weight can be obtained by the boiling away of the sterilizing fluid to render the device operative regardless of wide variations in the weight and bulk of articles placed in the container.

The sterilizing vessel or container 16 is supported between the upper ends of two parallel lever arms 46 which are mounted on a pivot shaft 48 journaled through the plates 10, and are rigidly connected at their lower ends by means of a heavy rod 50 which also serves as a counterbalancing weight for the device. At their upper ends the lever arms 46 are provided with bearing pins 52 which are arranged to fit into V-shaped bearings 54 formed in the brackets 56 secured one at each end of the oblong vessel or container 16. As will clearly be seen in Fig. 2 of the drawings, the weighted rod 50 is located to one side of the line of centers extending through the bearing pins 52 and the pivot 48, so that the supporting arms 46 and the vessel 16 when empty will tend to assume a position of equilibrium in a plane slightly inclined from the vertical away from the heating unit. This will be roughly the dotted line position B in Fig. 2.

The operation of the device may be described as follows:—The surgical instruments or paraphernalia to be sterilized are placed on the tray 42 within the container 16 which is then filled with sterilizing liquid preferably to the level indicated by the line 41. The device is now positioned with the vessel 16 over the flame of the burner 18, the weight of the vessel with its contents being sufficient to overbalance the weighted rod and hold the vessel and supporting arms 46 in the full line position A in Fig. 2. The sterilizing process is permitted to continue until a sufficient weight of sterilizing liquid has been evaporated so that the weight of the rod 50 overbalances the weight of the container and its contents in position A. The container 16 will now be lifted by the movement of the lever arms 46 about their pivot under the influence of the weighted rod 50. Due to the position of the center of gravity of the container 16 which is considerably beneath the pivotal connection 52 with the lever arms 46, the rotational movements of the arms 46 will act to decrease the effective leverage exerted by the weight of the container and its contents more rapidly than that exerted by the weighted rod 50, and will consequently cause an acceleration of the rotational movement of the arms 46. The position of the weighted rod 50 at one side of the line of centers passing through the pivotal connection 52 of the container and the pivot 48, together with the acceleration described, acts to carry the container 16 over and beyond a vertical plane passing through the pivot 48 to position B. The weight of the instruments or paraphernalia therein and the weight of the remaining sterilizing liquid in the container prevents a condition of equilibrium from being established at the dotted line position B so that the supporting arms 46 and the container 16 will continue their movement to bring the container 16 to rest on the supporting flanges 14 in position C. Inasmuch as the position of the weighted rod 50 to one side of the line of centers as above pointed out exerts a considerably greater lifting moment on the container in position A than in position C, the weight of the container and its contents, while not sufficient to hold the container over the burner, is yet sufficient to hold the supporting arms 46 and the container 16 in the rest position C well away from the influence of the burner.

The nature and scope of the invention having been indicated, and a construction embodying the several features of the invention having been specifically described, what is claimed is:

1. A sterilizing apparatus having, in combination, a heating unit, a sterilizing container, a pivoted support for the container arranged to carry the container above its pivot, and a counterbalancing weight carried by said pivoted support below its axis arranged upon loss of weight in the container to carry the container from an operative position adjacent said heating unit vertically over and beyond its pivot away from the heating unit.

2. A sterilizing apparatus having, in combination, a heating unit, a sterilizing container, a support mounted to turn about a fixed pivot and having a pivotal connection with said container located above said pivot for the support, and a counterbalancing weight carried by said support below its pivot and to one side of the line of centers extending through said pivots arranged upon loss of weight in the container to carry the container from an operative position adjacent said heating unit over said pivot for the support.

3. A sterilizing apparatus having, in combination, a heating unit, a sterilizing container, a support for the container arranged to turn about a fixed axis and having a supporting connection with said container above said axis, a counterbalancing weight carried by said support below its axis arranged upon loss of weight in the container to carry the container over said axis away from said heating unit, and means for limiting the movement of the container and support in each direction.

4. A sterilizing apparatus having, in combination, a heating unit, a sterilizing container, a support for the container arranged to turn about a fixed axis, a pivotal connection from which said container is suspended located on the support above the axis, and a counterbalancing weight carried by said support below its pivot arranged upon loss of weight in the container to carry the container from an operative position adjacent said heating unit vertically over and beyond said axis away from the heating unit.

5. A sterilizing apparatus having, in combination, a heating unit, a sterilizing container, a support mounted to turn about a fixed pivot and having a pivotal connection with said container located above said pivot for the support, and a counterbalancing weight carried by said support below its axis and to one side of the line of centers passing through said pivotal connection and axis arranged upon loss of weight in the container to move the container from an operative position adjacent said heating unit vertically over and beyond said axis.

6. A sterilizing apparatus having, in combination, a heating unit, a sterilizing container, a support for the container arranged to turn about a fixed axis and having a pivotal connection from which the container is suspended above said axis, means for limiting the movement of said container and support in each direction from a limiting position adjacent said burner to a limiting position of the container horizontally considered on the other side of said axis, and a counterbalancing weight carried by said support below said axis and to one side of a line of centers passing through said pivotal connection and axis arranged upon loss of weight in the container to move the container from its operating position over said axis to a limiting inoperative position.

7. A sterilizing apparatus having, in combination, a sterilizing container, a stationary frame having a relatively large horizontal supporting surface for said container, a heating unit located on said frame near one end of said supporting surface, a support for the container arranged to turn about a fixed axis on said frame comprising parallel lever arms at their upper ends having bearing pins to provide a pivotal support for the container, and a counterbalancing weight secured to downwardly extending portions of said arms at one side of a line of centers extending through said pivotal connection and axis arranged upon loss of weight in the container to carry the container from a rest position on said supporting surface within the influence of the heating unit over the axis to a second position on said supporting surface out of the influence of the heating unit.

8. A sterilizing apparatus having, in combination, a heating unit, a stationary frame, a support for the container arranged to turn about a fixed axis on said frame comprising parallel lever arms at their upper ends having pivotal connection with said container, and a counterbalancing weight secured to the downwardly extending portions of said arms at one side of a line of centers extending through said pivotal connection and axis to provide a relatively great lifting moment for said vessel on one side of a vertical plane extending through said axis and a relatively small lifting moment for said container on the other side of said axis.

9. A sterilizing apparatus having, in combination, a sterilizing container, a stationary frame, a support for the container pivoted on the frame and arranged to carry the container over its pivot to rest positions on the frame located a substantially equal distance to each side of a vertical plane passing through the pivot, a heating unit located adjacent one of said rest positions on the frame, and means for weighting the support and container mounted thereon equally against movement in either direction from a position slightly inclined from the vertical away from said heating unit.

10. A sterilizing apparatus having, in combination, a heating unit, a sterilizing container arranged to receive a sterilizing fluid, a tray in said container raised from the bottom thereof to provide beneath the tray a substantial reservoir of sterilizing fluid unaffected by the displacement of articles placed in the container for sterilization, a support for the container arranged to turn about a fixed pivot to move the container away from the heating unit, and means for exerting a yielding strain having a predetermined value on said support rendered operative by loss of weight in the container to overbalance and lift the container away from an operative position within the influence of the heating unit, said reservoir being of such size as to permit a sufficient loss of weight to lift the container by the evaporation of only a portion of the sterilizing fluid for a wide range of displacement and weight of articles placed in the container for sterilization.

11. A sterilizing apparatus having, in combination, a stationary frame, a heating unit mounted on the frame, a sterilizing container arranged to receive a sterilizing fluid, a supporting means for articles to be sterilized within the container arranged to provide a substantial reservoir of sterilizing fluid unaffected by the displacement of articles placed in the container for sterilization, a support for the container pivoted on said frame to move the container into an operating position adjacent said heating unit, and a counterbalancing weight carried by said support arranged upon loss of weight in the container to overbalance and lift the container away from the influence of the heating unit, said reservoir being of such size as to permit a sufficient loss of weight to lift the container by the evaporation of only a portion of the sterilizing fluid for a wide range of displacement and weight of the articles placed in the container for sterilization.

A. ALEXANDER ROBEY.